US007991003B2

(12) United States Patent
Hamanaka (10) Patent No.: US 7,991,003 B2
(45) Date of Patent: Aug. 2, 2011

(54) TRANSMISSION APPARATUS AND TRANSMISSION METHOD

(75) Inventor: Akiyoshi Hamanaka, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 12/191,174

(22) Filed: Aug. 13, 2008

(65) Prior Publication Data

US 2009/0046743 A1 Feb. 19, 2009

(30) Foreign Application Priority Data

Aug. 14, 2007 (JP) ................................ 2007-211389

(51) Int. Cl.
*H04J 3/16* (2006.01)
*H04N 17/00* (2006.01)

(52) U.S. Cl. ........ 370/468; 370/369; 370/252; 370/477; 375/240.12

(58) Field of Classification Search ............. 375/240.02, 375/240.12, 240.13; 348/409.1, 410.1, 390.1, 348/419.1; 370/252, 329, 389, 468, 469, 370/477

See application file for complete search history.

(56) References Cited

U.S. PATENT DOCUMENTS

| | | | | |
|---|---|---|---|---|
| 5,515,377 A | * | 5/1996 | Horne et al. ............. 370/395.64 |
| 6,032,180 A | * | 2/2000 | Nishikawa ..................... 725/115 |
| 6,535,557 B1 | * | 3/2003 | Saito et al. .................. 375/240.1 |
| 6,778,553 B1 | * | 8/2004 | Chou ............................. 370/465 |
| 6,785,334 B2 | * | 8/2004 | van der Schaar et al. ........................ 375/240.16 |
| 6,975,645 B1 | * | 12/2005 | Suzuki et al. ................. 370/465 |
| 7,164,680 B2 | * | 1/2007 | Loguinov ...................... 370/394 |
| 7,617,436 B2 | * | 11/2009 | Wenger et al. ................ 714/758 |
| 7,656,815 B2 | * | 2/2010 | Kellerer et al. ............... 370/252 |
| 2002/0181506 A1 | * | 12/2002 | Loguinov ...................... 370/473 |
| 2003/0035480 A1 | * | 2/2003 | Schaar et al. ............. 375/240.14 |
| 2004/0086051 A1 | | 5/2004 | Mizoguchi |
| 2005/0025053 A1 | * | 2/2005 | Izzat et al. ..................... 370/231 |
| 2005/0063473 A1 | * | 3/2005 | Koyama et al. .......... 375/240.27 |
| 2005/0147164 A1 | * | 7/2005 | Wu et al. .................. 375/240.12 |
| 2006/0251169 A1 | * | 11/2006 | Wang ........................ 375/240.12 |
| 2007/0206592 A1 | * | 9/2007 | Itakura et al. ................. 370/389 |
| 2009/0031038 A1 | * | 1/2009 | Shukla et al. ................. 709/231 |
| 2009/0046743 A1 | * | 2/2009 | Hamanaka .................... 370/498 |

FOREIGN PATENT DOCUMENTS

| | | |
|---|---|---|
| EP | 1058459 A2 | 5/2000 |
| JP | 2000-350197 | 12/2000 |
| JP | 2004-140651 | 5/2004 |

* cited by examiner

*Primary Examiner* — Chi H Pham
*Assistant Examiner* — Ahmed Elallam
(74) *Attorney, Agent, or Firm* — Canon U.S.A., Inc., IP Division (57) ABSTRACT

A transmission apparatus of the present invention includes an encoder unit configured to encode data including plural layers for each of the layers, a packetizing unit configured to generate a packet based on the data encoded by the encoder unit, a determination unit configured to determine transmission intervals at which the generated packet is transmitted for each of the layers, and a transmission unit configured to transmit the generated packet at the determined transmission intervals, wherein the transmission intervals are changed for each specified packet, where the change varies with each of the plurality of layers.

10 Claims, 10 Drawing Sheets

TRANSMISSION APPARATUS AND TRANSMISSION METHOD

BACKGROUND OF THE INVENTION

1. Field of the Invention

The present invention relates to a transmission apparatus and a transmission method, and particularly relates to a transmission apparatus and a transmission method that are suitable for transmitting a packet.

2. Description of the Related Art

Hitherto, technologies to transmit data including plural layers on a layer-to-layer basis have been developed. As an example of the above-described technologies, Japanese Patent Laid-Open No. 2004-140651 discloses the technology for distributing a code amount on time base by providing an offset at the time when encoding performed in frames for each of the layers is started. Thus, the code amount is distributed on the time base, which makes it possible to decrease a local transmission rate without changing a transmission rate determined on a per-unit-time basis, and reduce packet losses due to traffic.

According to known technologies, however, the concentration of the code amount on the time base is distributed by shifting the transmission-start time for each of the layers and/or transmitting the data corresponding to each of the layers in time areas that do not overlap with one another. That is to say, the method of transmitting the data corresponding to each of the layers is not modified according to known technologies. Therefore, it has been difficult to control the probability of the occurrence of transmission errors based on the layer importance.

SUMMARY OF THE INVENTION

Accordingly, the present invention allows for easily controlling the probability of the occurrence of transmission errors based on the layer importance.

Therefore, a transmission apparatus according to an aspect of the present invention includes an encoder unit configured to encode data including a plurality of layers, a packetizing unit configured to generate a packet based on the data encoded by the encoder unit, a determination unit configured to determine transmission intervals at which the generated packet is transmitted for each of the layers, and a transmission unit configured to transmit the generated packet at the determined transmission intervals, wherein the transmission intervals are changed for each specified packet, where the change varies with each of the plurality of layers.

Since a transmission pattern is determined for each layer according to the present invention, it becomes possible to easily control the probability of the occurrence of a transmission error based on the layer importance. Therefore, it becomes possible to reduce the probability of the occurrence of an error in the transmission of a packet of a layer with high importance, for example.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

First Embodiment

Hereinafter, a first embodiment of the present invention will be described with reference to the attached drawings.

Figure 1:
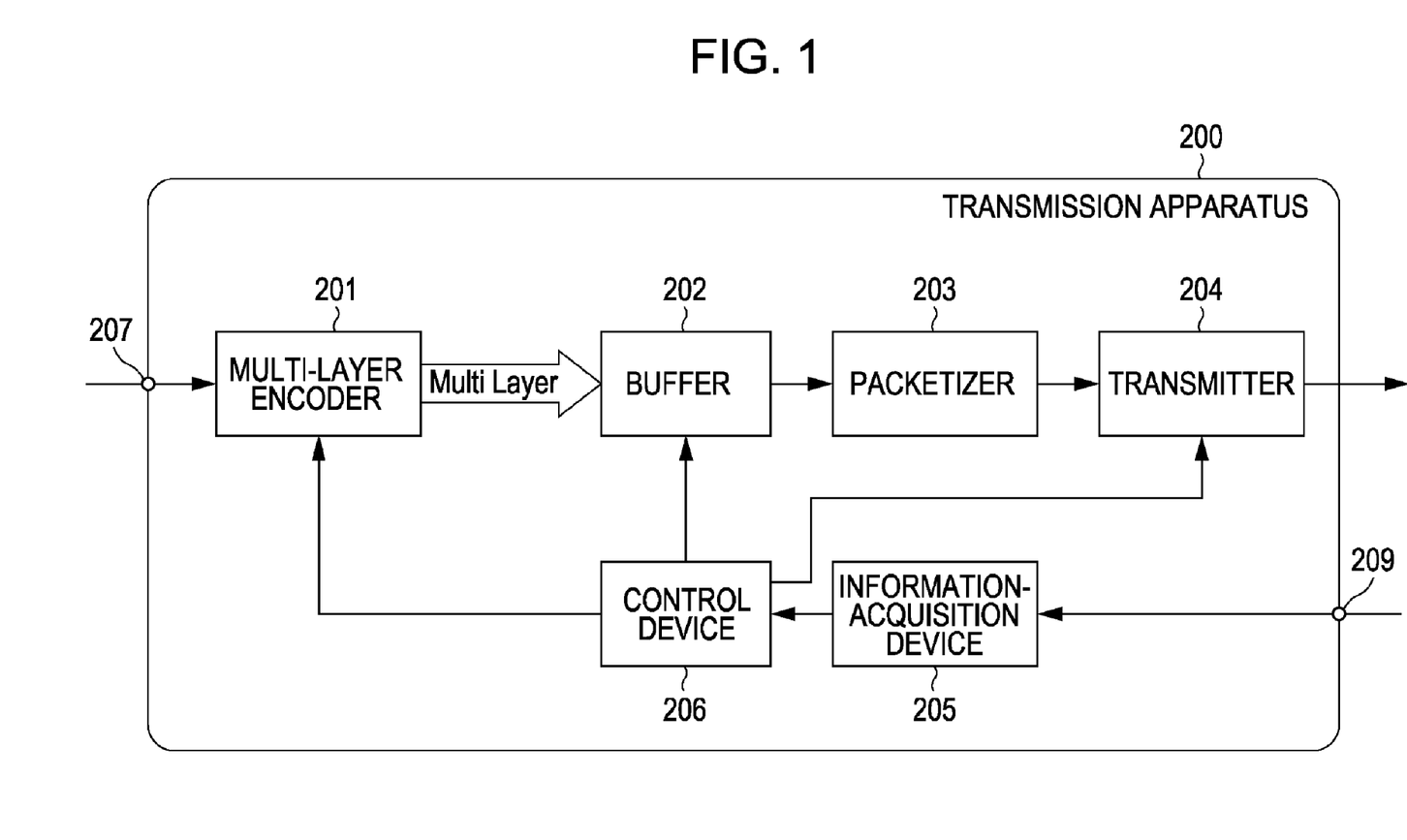
FIG. 1 shows an example of the configuration of a transmission apparatus according to a first embodiment of the present invention.

FIG. 1 shows an example of the configuration of a transmission apparatus 200. In the transmission apparatus 200, digital-video signals are transmitted to a multi-layer encoder 201 via an input end 207. If the multi-layer encoder 201 has an analog-to-digital (A/D) conversion function, analog-video signals are transmitted to the multi-layer encoder 201 via the input end 207, and digital-video signals are generated in the multi-layer encoder 201.

Figure 2:
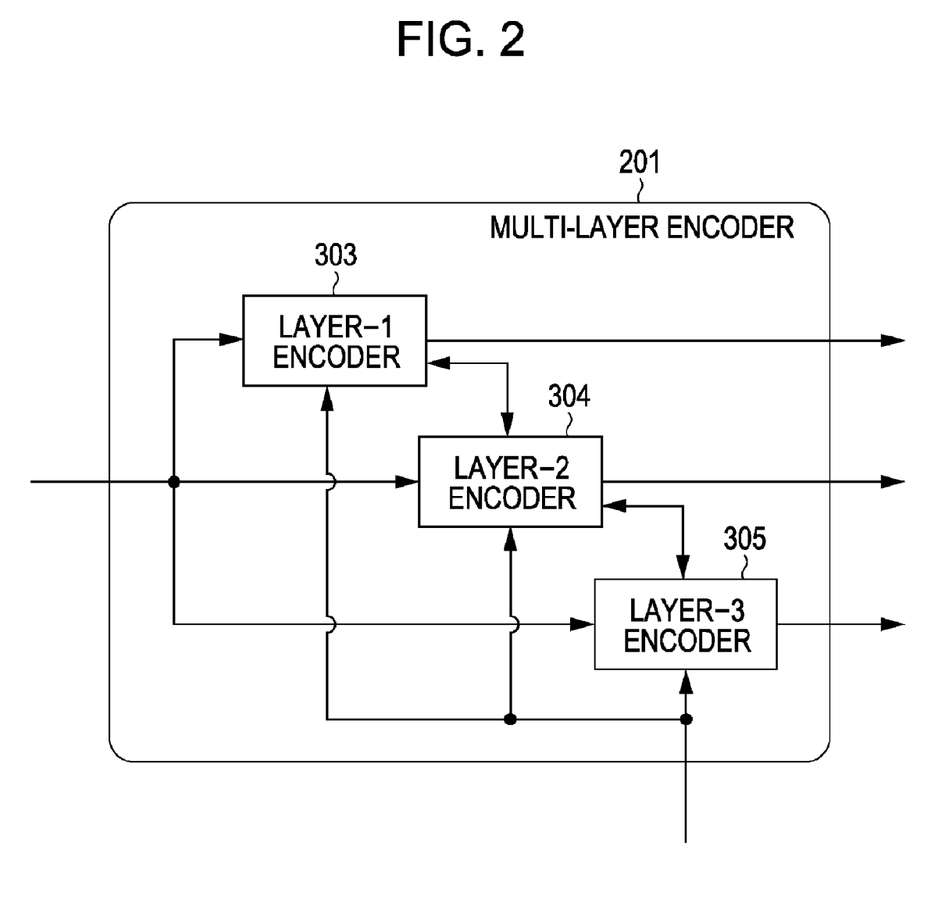
FIG. 2 shows an example of the configuration of a multi-layer encoder according to the first embodiment.

FIG. 2 shows an example of the configuration of the multi-layer encoder 201. In FIG. 2, the multi-layer encoder 201 includes a layer-1 encoder 303, a layer-2 encoder 304, and a layer-3 encoder 305. Activation and non-activation of each of the layer-1 encoder 303, the layer-2 encoder 304, and the layer-3 encoder 305 can be separately controlled by using a control device 206 shown in FIG. 1. The multi-layer encoder 201 of the first embodiment can make a choice among three types of operations including encoding for a layer 1 (the lowermost layer) only, encoding for the layer 1 and a layer 2, and encoding for all of the layer 1, the layer 2, and a layer 3.

Hereinafter, the first embodiment will be described based on the premise that a control unit 206 instructs the multi-layer encoder 201 to perform spatial-scalable encoding while the number of layers is determined to be three (the layers 1, 2, and 3). Thus, even though the first embodiment will be described based on the premise that the number of layers of data is three, the number of layer has to be at least one.

The digital-video signals transmitted to the multi-layer encoder 201 are transmitted to the above-described layer-1 encoder 303, the layer-2 encoder 304, and the layer-3 encoder 305 in parallel. Further, in the first embodiment, the frame size of the digital-video signals transmitted to the multi-layer encoder 201 is 1920×1080 [pixels], namely, a full HD size.

Figure 3:
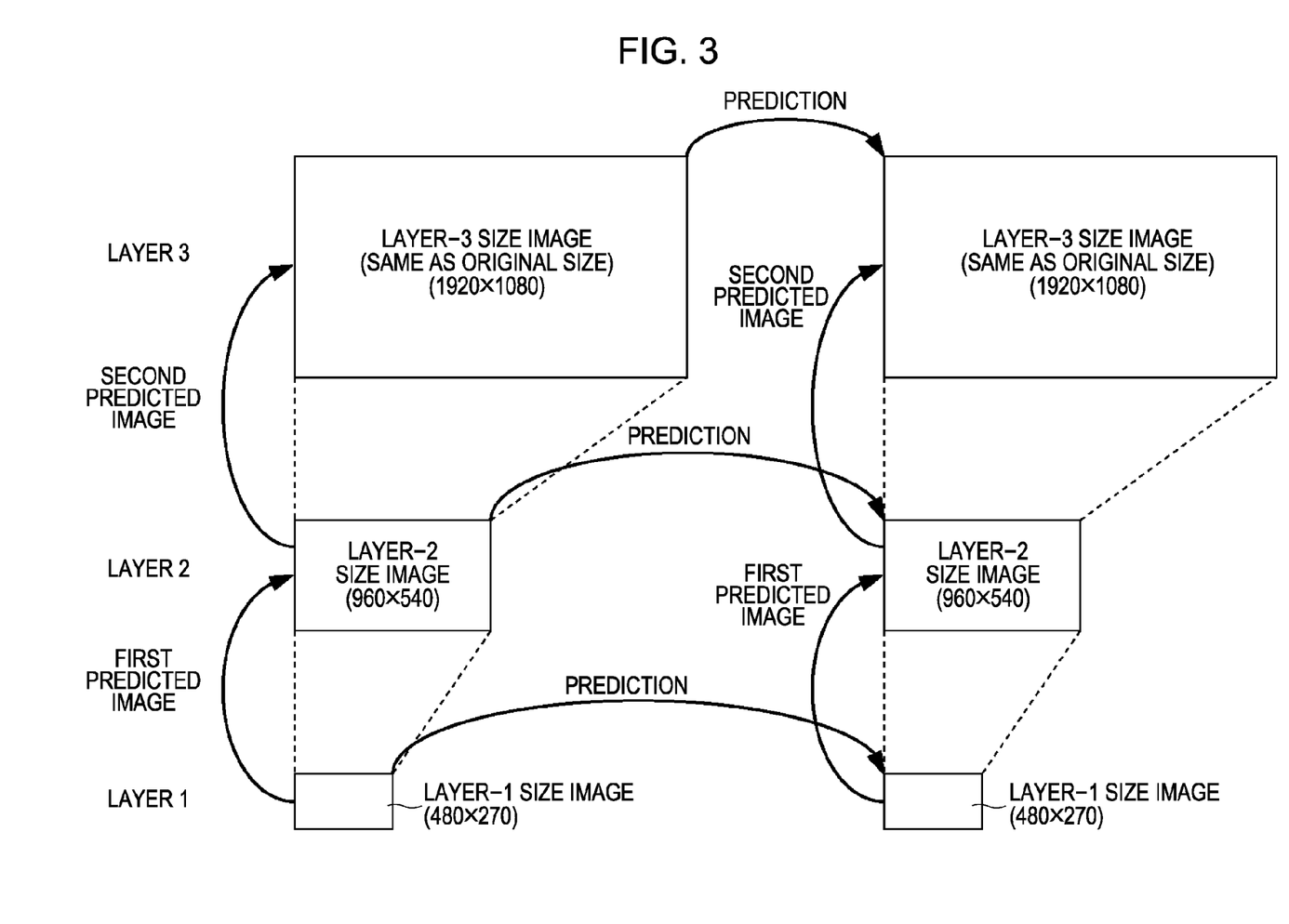
FIG. 3 conceptually shows an example image generated by the transmission apparatus (the multi-layer encoder) according to the first embodiment.

FIG. 3 conceptually shows an example image generated by the transmission apparatus 200 (the multi-layer encoder 201).

The layer-1 encoder 303 generates a layer-1 image obtained by vertically and horizontally reducing the image corresponding to the transmitted digital-video signals to one quarter the original image according to an arbitrary method. Then, the layer-1 encoder 303 generates a layer-1-encoded image by performing intra-frame encoding and/or inter-frame-prediction encoding in the layer 1 based on a predetermined encoding format.

Figure 4:
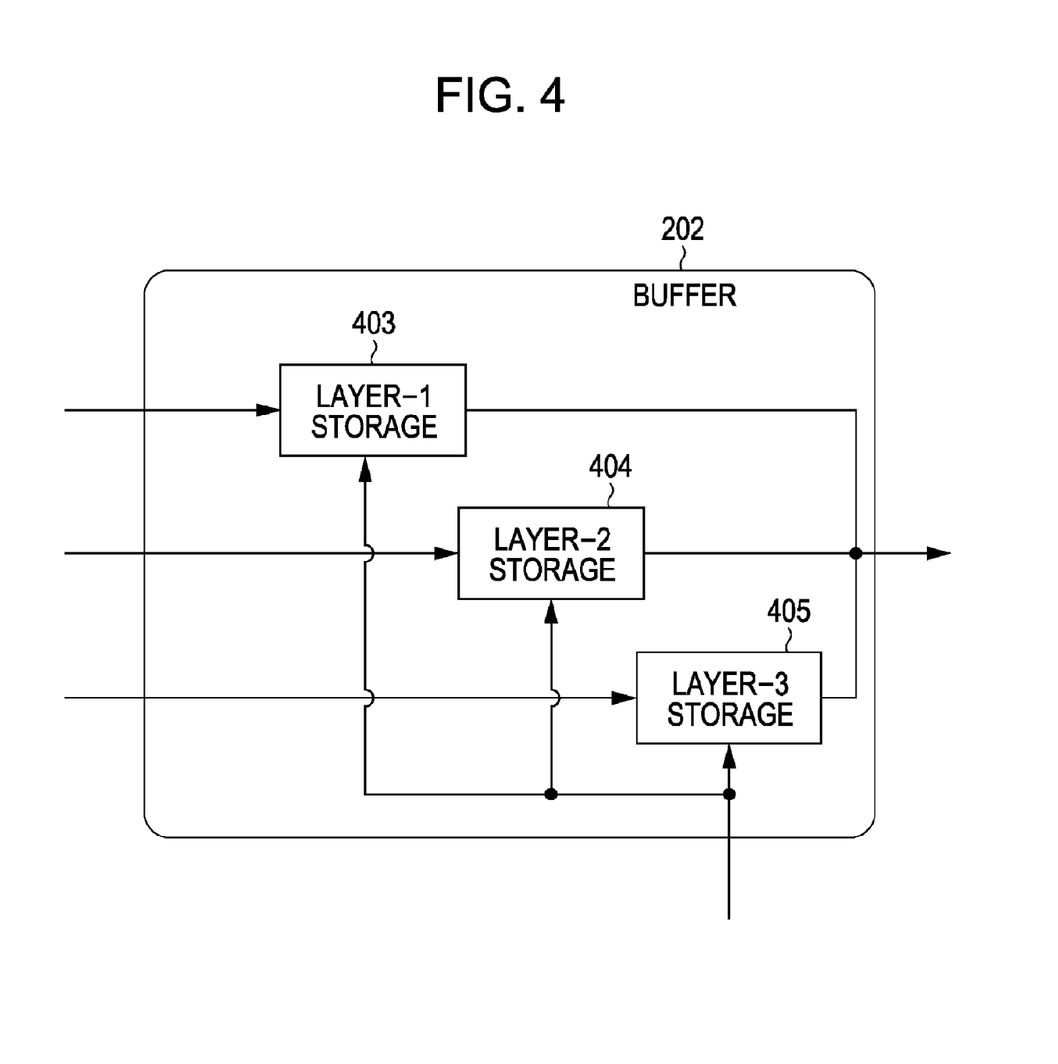
FIG. 4 shows an example of the configuration of a buffer according to the first embodiment.

Data on the layer-1-encoded image subjected to the intra-frame encoding and/or the inter-frame-prediction encoding is stored in a buffer 202 shown in FIG. 1 (a layer-1-storage device 403 shown in FIG. 4). FIG. 4 shows an example of the configuration of the buffer 202.

The layer-1 encoder 303 stores the layer-1-encoded-image data in the buffer 202 in the above-described manner and generates a layer-1-decoded image by decoding the layer-1-encoded-image data. Then, the layer-1 encoder 303 generates an image by vertically and horizontally magnifying the layer-1-decoded image so that the generated image is twice as large as the layer-1-decoded image, and transmits data on the generated image to the layer-2 encoder 304, as data on the first predicted image.

The layer-2 encoder 304 generates a layer-2 image obtained by vertically and horizontally reducing the image corresponding to the transmitted digital-video signals to one half the original image according to an arbitrary method. The layer-2 encoder 304 performs inter-layer (the layers 1 and 2) prediction between the above-described layer-2 image and the first predicted image on which data is transmitted from the layer-1 encoder 303. Consequently, data on a layer-2-prediction error is externally transmitted.

As is the case with the generated layer-1-encoded image, the layer-2 encoder 304 generates a layer-2-encoded image by performing the intra-frame encoding and/or the inter-frame-prediction encoding in the layer 2 for the above-described layer-2-prediction error.

The layer-2 encoder 304 stores the layer-2-encoded-image data in the buffer 202 shown in FIG. 1 (a layer-2-storage device 404 shown in FIG. 4) and (preferably at the same time) decodes the layer-2-decoded-image data. Consequently, a layer-2-decoded image is generated. The layer-2 encoder 304 generates an image by vertically and horizontally magnifying the layer-2-decoded image so that the generated image is twice as large as the layer-2-decoded image, and transmits data on the generated image to the layer-3 encoder 305, as data on the second predicted image.

The layer-3 encoder 305 determines the transmitted digital-video signals to be a layer-3-input image, and performs inter-layer (the layers 2 and 3) prediction between the layer-3-input image and the second predicted image on which data is transmitted from the layer-2 encoder 304. Consequently, data on a layer-3-prediction error is externally transmitted.

As is the case with the generated layer-2-encoded image, the layer-3 encoder 305 performs the intra-frame encoding and/or the inter-frame-prediction encoding in the layer 3 for the above-described layer-3-prediction error, so that a layer-3-encoded image is generated. The layer-3 encoder 305 stores data on the layer-3-encoded image in the buffer 202 shown in FIG. 1 (a layer-3-storage device 405 shown in FIG. 4).

Thus, in the first embodiment, an encoder unit is achieved by using the multi-layer encoder 201 (the layer-1 encoder 303, the layer-2 encoder 304, and the layer-3 encoder 305).

The first embodiment has been described based on the premise that the encoding format is the spatial-scalable encoding. However, the encoding format may be encoding other than the above-described encoding. The encoding format may be time-scalable encoding and/or a signal-to-noise-ratio (SNR) scalable encoding defined in a moving-picture-experts-group (MPEG)-2 system, for example. Further, according to the configuration of the buffer 202 used in the first embodiment, a memory specifically used for each layer is independently provided, as shown in FIG. 4. However, without being limited to the above-described configuration, a single memory may be physically divided based on address information and used, for example, so that the memory specifically used for each layer is configured.

The control device 206 gives importance to an encoded image of each of layers (the layer-1-encoded image, the layer-2-encoded image, and the layer-3-encoded image) in advance, where data on each of the encoded images is stored in the buffer 202 in the above-described manner. The importance may be automatically given to each of the encoded images based on an arbitrary function. Further, the importance may be externally specified by using an arbitrary input unit.

Hereinafter, the first embodiment will be described based on the premise that the importance decreases in the order of the layer 1, the layer 2, and the layer 3 (the most highest importance is given to the layer 1), for example.

Figure 5:
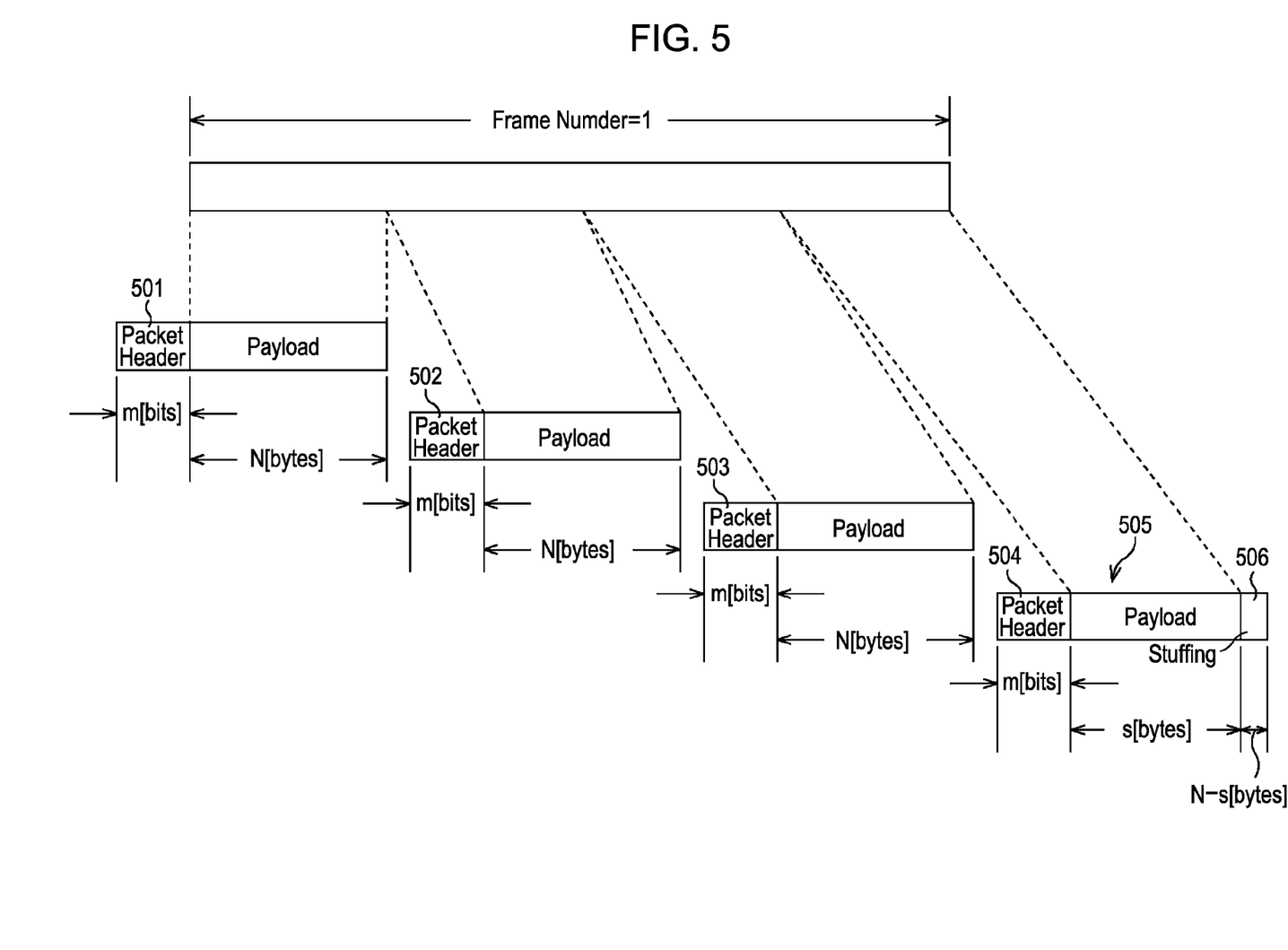
FIG. 5 is a conceptual drawing provided to exemplarily show how encoded data is packetized according to the first embodiment.

Further, hereinafter, when the amount of code generated in each layer of an arbitrary frame is packetized, the number of packets becomes as shown below, for example. Layer 1: 20 packets, Layer 2: 6 packets, Layer 3: 2 packets The layer-1-encoded data belonging to the layer 1 of the arbitrary frame is read from the layer-1-storage device 403 and transmitted to a packetizer 203. FIG. 5 is a conceptual drawing provided to exemplarily show how encoded data is packetized.

The packetizer 203 segments the transmitted layer-1-encoded data in units of a constant bit number (N [bytes] in FIG. 5) from the top of the frame and gives predetermined headers 501, 502, 503, and 504 to the segmented data, respectively, as shown in FIG. 5.

If the amount of remaining code of the layer-1-encoded data is less than the above-described N [bytes] (s [bytes]) when a packet 505 including the final data segmented from the frame is generated, the packetizer 203 performs the following processing. Namely, the packetizer 203 fills the remaining (N-s) [bytes] with an arbitrary stuffing byte 506 so that the sizes of all of the packets become the same. Here, the stuffing byte denotes data which is handled as invalid data when the data is transmitted to a decoder.

Thus, in the first embodiment, a packetization unit is achieved by using the packetizer 203.

Figure 6:
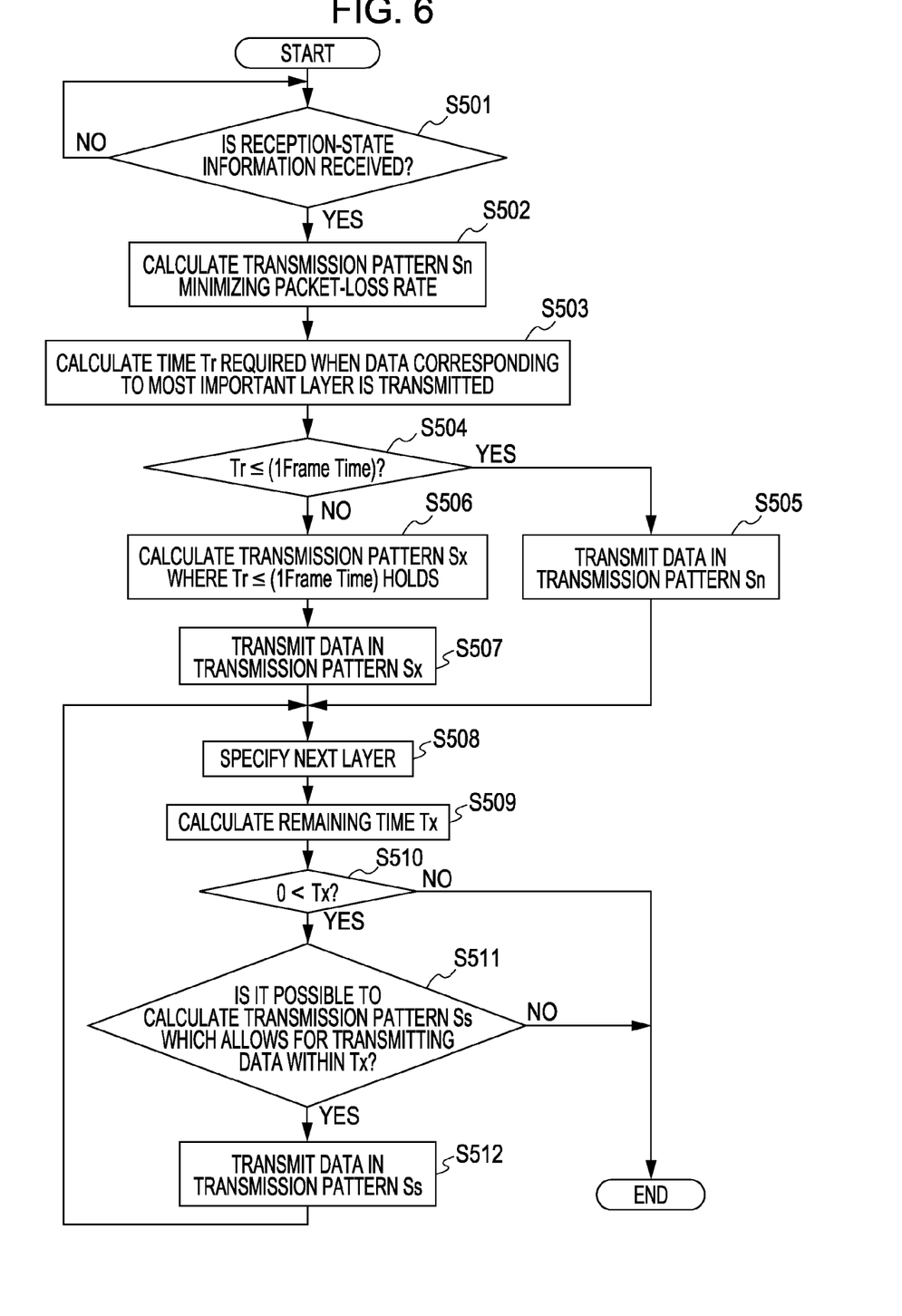
FIG. 6 is a flowchart illustrating an example processing performed in the transmission apparatus, so as to transmit a packet, according to the first embodiment.

The layer-1-encoded data packetized by the packetizer 203 (a packet generated by the packetizer 203) is transmitted to a transmitter 204. The layer-1-encoded data (a packet) transmitted to the transmitter 204 is controlled and transmitted according to a flowchart shown in FIG. 6. Thus, in the first embodiment, a communication unit is achieved by using the transmitter 204. FIG. 6 is a flowchart illustrating example processing performed by the transmission apparatus 200, so as to transmit the packet.

First, an information-acquisition device 205 waits until information about the reception state of an apparatus provided on the reception side (a reception apparatus) is acquired via an information-input end 209, where the reception apparatus becomes the transmission destination of the packet (step S501). The reception-state information includes, for example, information about the average-reception rate, the packet-loss rate, and the buffer-occupancy rate of the apparatus provided on the reception side.

When the reception-state information is acquired, the control device 206 selects a layer with the highest importance (the layer 1 in the first embodiment) from among the layers of the above-described arbitrary frame. Then, the control device 206 determines a packet-transmission pattern Sn based on the layer-1-encoded data belonging to the layer 1 with the highest importance in the following manner, for example (step S502). Namely, the control device 206 calculates the transmission pattern Sn in which the packet-loss rate (the probability of the occurrence of a packet loss) is minimized in the apparatus provided on the reception side by statistically evaluating the average-reception-rate information, the packet-loss-rate information, and the reception-buffer-occupancy-rate information. Here, the transmission pattern Sn is determined based on, for example, the number of packets transmitted for one burst transmission and intervals at which each packet is transmitted.

Further, at the above-described step S502, the transmission pattern Sn can be calculated, so as not to allow the occurrence of the packet loss. Here, the burst transmission is a method of transmitting grouped packets at the same time. A number of bursts denotes the number of packets transmitted through one burst transmission.

Figure 7:
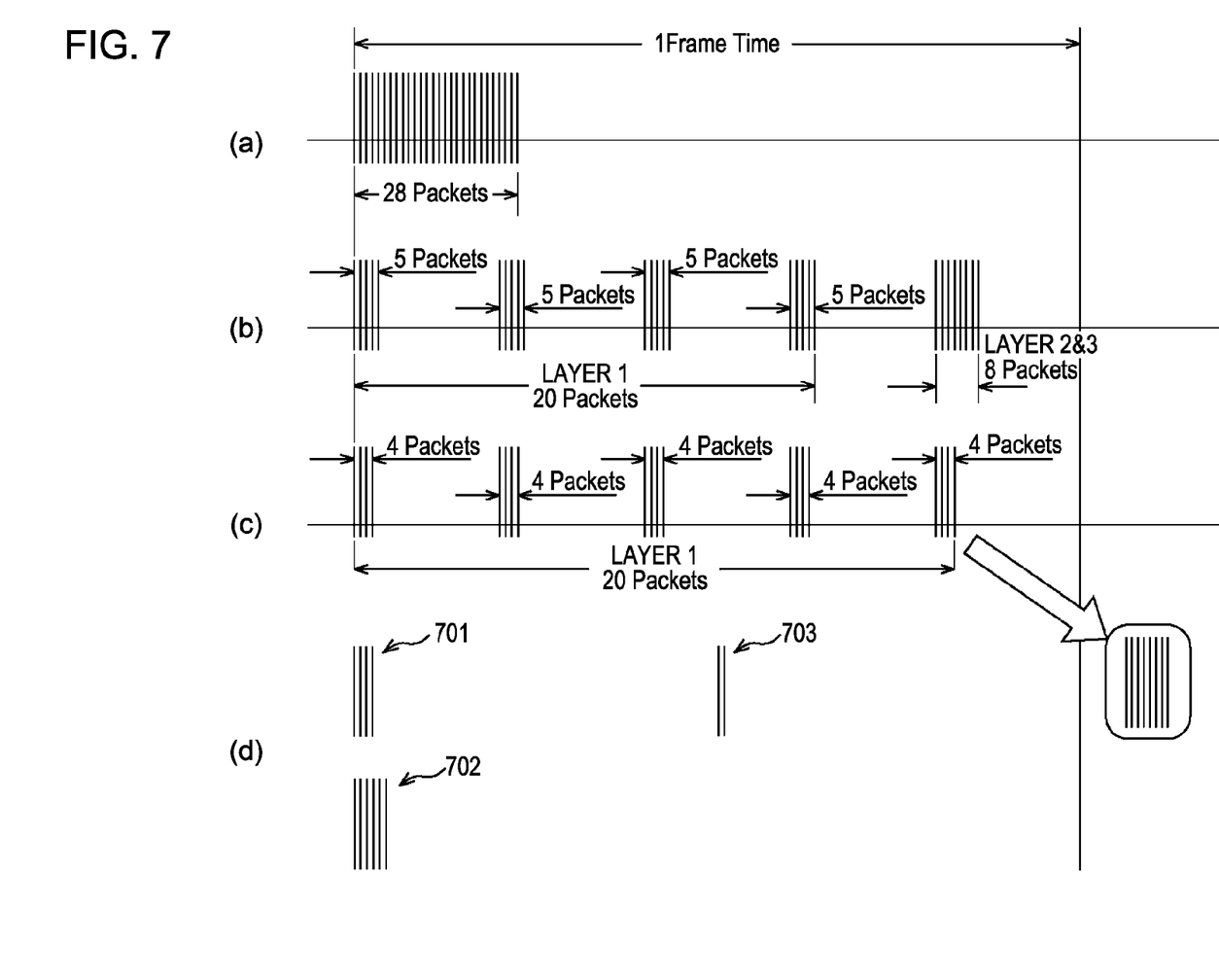
FIG. 7 exemplarily shows packet-transmission patterns according to the first embodiment.

FIG. 7 shows an example pattern in which the packets are transmitted. Part (a) of FIG. 7 shows a transmission pattern in which the packets of all of the layers are transmitted through one burst transmission (a known transmission pattern). Each of parts (b) and (c) of FIG. 7 shows an example of the transmission pattern Sn determined by the transmission apparatus 200 of the first embodiment. According to the part (b), the value of the transmission pattern Sn used for the layer 1 (the layer-1-encoded data) is 5 (Sn=5). Further, the value of the transmission pattern Sn used for each of the layers 2 and 3 (the layer-2-encoded data and the layer-3-encoded data) is 8 (Sn=8). Here, the transmission pattern Sn used for the layers 2 and 3 is acquired by obtaining a transmission pattern used for the layer 2 and that used for the layer 3 separately (refer to steps S509, S510, S511, and S512). Further, according to the part (c), the value of the transmission pattern Sn is 4 (Sn=4). Further, part (d) of FIG. 7 shows a packet 701 generated based on the layer-1-encoded data, a packet 702 generated based on the layer-2-encoded data, and a packet 703 generated based on the layer-3-encoded data. The above-described packets 701 to 703 are transmitted through the burst transmission according to the transmission pattern Sn shown in the part (b) and/or the part (c) of FIG. 7.

The above-described statistical evaluation can be achieved by performing the following first, second, and third processing procedures. According to the first processing procedure, at least one point determined based on the average-reception rate, the packet-loss rate, and the number of bursts corresponding to the packet-loss rate is plotted on the three-dimensional coordinates and data on the plotted point is stored over an arbitrary storage period, as a database. The control device 206 reads data on a reception rate R in which the packet-loss rate is minimized and data on a number of bursts L1 from the database.

According to the second processing procedure, at least one point determined based on the reception-buffer-occupancy rate, the packet-loss rate, and the number of bursts corresponding to the packet-loss rate is plotted on the three-dimensional coordinates and data on the plotted point is stored over an arbitrary storage period, as a database. The control device 206 reads data on a reception-buffer-occupancy rate Q in which the packet-loss rate is minimized and data on a number of bursts L2 from the database.

According to the third processing procedure, the control device 206 determines the number of bursts corresponding to the smaller of the packet-loss rate which is estimated to be the minimum rate through the first processing procedure and the packet-loss rate which is estimated to be the minimum rate through the second processing procedure to be the transmission pattern Sn. Further, at least one point determined based on the average-reception rate, the reception-buffer-occupancy rate, and the number of bursts corresponding to the reception-buffer-occupancy rate may be plotted on the three-dimensional coordinates and data on the plotted point may be stored over an arbitrary storage period, as a database. In that case, the control device 206 reads data on a number of bursts L3 maximized to the extent that an overflow and/or an underflow does not occur from the database. If the smaller of the number of bursts L1 and L2 on which data is read through the first and second processing procedures is larger than the number of bursts L3, the number of bursts L3 may be determined to be the transmission pattern Sn. Otherwise, the smaller of the number of bursts L1 and L2 may be determined to be the transmission pattern Sn.

The above-described statistical evaluation may be made according to various methods without being limited to the above-described embodiment.

Next, the control device 206 calculates a time Tr required to transmit the encoded data corresponding to the layer 1 with the highest importance by as much as a single frame in the transmission pattern Sn calculated at step S502 (step S503). Then, the control device 206 determines whether the required time Tr is equivalent to and/or less than a 1-frame time (step S504).

If the determination result shows that the required time Tr is equivalent to and/or less than the 1-frame time (YES in step S504), the control device 206 instructs the transmitter 204 to use the transmission pattern Sn calculated at step S503. The transmitter 204 performs the burst transmission for the layer-1-encoded data (the encoded data corresponding to the layer 1) based on the transmission pattern Sn (step S505).

On the other hand, if the required time Tr exceeds the 1-frame time (NO in step S504), the control device 206 additionally calculates a transmission pattern Sx in which the required time Tr falls within the 1-frame time (step S506).

Here, the transmission pattern Sx can be calculated in the following manner, for example.

The time corresponding to 1 frame is determined to be Tf, the cycle of a system clock provided in the transmission apparatus 200 is determined to be T, and the amount of code occurring in an arbitrary encoded frame is determined to be Ri, and the amount of code that can be transferred for a single packet is determined to be Rp. In that case, the number of times the burst transmission can be performed within the 1-frame time, the number being determined to be Nb, is expressed in Equations (1) and (2), as below.

$$Nb=(Tf/T) \qquad (1)$$

$$Nb=(Tf/T)+1 \qquad (2)$$

Here, Equation (1) shows a value obtained when the remainder left when the 1-frame-corresponding time Tf is divided by the system-clock cycle T is zero. On the other hand, Equation (2) shows a value obtained when the remainder left when the 1-frame-corresponding time Tf is divided by the system-clock cycle T is larger than zero.

Further, the number of packets required to transfer the whole amount of code of an arbitrary encoded frame, the number being determined to be Np, is expressed in Equations (3) and (4), as below.

$$Np=(Ri/Rp) \qquad (3)$$

$$Np=(Ri/Rp)+1 \qquad (4)$$

Here, Equation (3) shows a value obtained when the remainder left when the amount Ri of the code occurring in the arbitrary encoded frame is divided by the amount Rp of the code that can be transferred for the single packet is zero. On the other hand, Equation (4) shows a value obtained when the remainder left when the amount Ri of the code occurring in the arbitrary encoded frame is divided by the amount Rp of the code that can be transferred for the single packet is larger than zero.

When using the number Nb of times the burst transmission can be performed within the 1-frame time and the number Np of packets required to transfer the whole amount of code of the arbitrary encoded frame, a number of bursts Lt is expressed in Equations (5) and (6), as below.

$$Lt=(Np/Nb) \quad (5)$$

$$Lt=(Np/Nb)+1 \quad (6)$$

Here, Equation (5) shows a value obtained when the remainder left when the number Np of packets required to transfer the whole amount of code of the arbitrary encoded frame is divided by the number Nb of times the burst transmission can be performed within the 1-frame time is zero. Further, Equation (6) shows a value obtained when the remainder left when the number Np of packets required to transfer the whole amount of code of the arbitrary encoded frame is divided by the number Nb of times the burst transmission can be performed within the 1-frame time is larger than zero.

The control device 206 can calculate the number of bursts Lt and determine the number of bursts Lt to be the transmission pattern Sx by performing the above-described calculations corresponding to Equations (1) to (6). Incidentally, the transmission pattern Sx may be determined according to another method without being limited to the above-described embodiment.

The control device 206 instructs the transmitter 204 to use the transmission pattern Sx calculated at step S506. The transmitter 204 performs the burst transmission for the layer-1-encoded data based on the transmission pattern Sx (step S507).

Thus, in the first embodiment, a packet generated based on the encoded data corresponding to the layer 1 is transmitted with top priority. When the transmission of the packet generated based on the encoded data corresponding to the layer 1 is finished, the control device 206 determines the layer 2 which is the most important of all layers for which packet transmission is not yet performed (the second most important layer) to be a layer for processing (step S508).

Thus, in the first embodiment, the layer with the highest importance is determined at step S502, and a first determination unit is achieved by performing layer-specification processing at step S508.

Next, the control device 206 calculates a difference time (a remaining time) Tx, which is the difference between the time Tr required to transmit the layer-1-encoded data and the 1-frame time (=(1-frame time)−Tr) (step S509). Then, the control device 206 determines whether the value of the difference time Tx is a positive number (whether the value of the difference time Tx is larger than a threshold value (=0), or equivalent to and/or smaller than the threshold value) (step S510). Thus, in the first embodiment, a second determination unit is achieved by performing the processing corresponding to step S510.

If the determination result shows that the value of the difference time Tx is the positive number (YES in step S510), the control device 206 calculates a transmission pattern Ss used for all of the packets generated based on the layer-2-encoded data (the entire encoded data corresponding to the layer 2). At that time, the transmission pattern Ss is calculated so that the packet loss does not occur, or the packet-loss rate is minimized. Then, the control device 206 determines whether the calculated transmission pattern Ss includes a transmission pattern Ss which allows for transmitting all of the packets generated based on the layer-2-encoded data within the difference time Tx (step S511). Further, at step S511, it is determined whether it is possible to calculate the transmission pattern Ss which allows for transmitting all of the packets generated based on the layer-2-encoded data within the difference time Tx. The transmission pattern Ss may be calculated when it is determined that the calculation is possible.

Thus, in the first embodiment, a decision unit is achieved by performing the processing corresponding to each of steps S502, S506, and S511.

If the determination result shows that there is the transmission pattern Ss which allows for transmitting all of the packets generated based on the layer-2-encoded data within the difference time Tx (YES in step S511), the control device 206 instructs the transmitter 204 to sue the calculated transmission pattern Ss. The transmitter 204 performs the burst transmission for the layer-2-encoded data based on the transmission pattern Ss (step S512). Thus, in the first embodiment, a transmission unit is achieved by performing the processing corresponding to steps S505, S507, and S512.

Then, the processing returns to step S508, so as to specify the next layer, that is, the layer 3 to be a layer for processing. The data corresponding to the layer 3 and afterward is subjected to the processing corresponding to steps S509 to S512. In that case, at step S510, it is determined whether the value of the difference time Tx, which is the difference between the sum total of the times Tr required to transmit the encoded data (the layer-1-encoded data and the layer-2-encoded data) that had been transmitted by then and the 1-frame time, is larger than zero.

In the case where it is determined that the value of the difference time Tx is not the positive number at step S510 and where it is determined that there is not the transmission pattern Ss which allows for transmitting the entire layer-2-encoded data within the difference time Tx at step S511, the following processing is performed and the processing shown in FIG. 6 is finished. That is to say, the control device 206 abandons the encoded data corresponding to the layer 2 and all of the layers after the layer 2 (the layer-2-encoded data and the entire layer-3-encoded data), and finishes the processing shown in FIG. 6. In the first embodiment, an abandonment unit is achieved by performing the above-described processing. Further, the control device 206 may instruct the transmitter 204 not to transmit the encoded data corresponding to the layer 2 and all of the layers after the layer 2.

Further, if the next layer does not exist at step S508 (if the processing corresponding to step S509 and afterward is performed for a layer with low importance), the processing shown in FIG. 6 is finished without performing the processing corresponding to step S509 and afterward. Further, the processing performed by the control device 206, which is shown in FIG. 6, may be achieved by the transmitter 204.

According to an example shown in part (b) of FIG. 7, there are twenty packets of the layer-1-encoded data. The above-described twenty packets are transmitted through the burst transmission while determining the value of the transmission pattern Sn to be five. Further, there are six packets of the layer-2-encoded data and two packets of the layer-3-encoded data. The above-described packets are transmitted through the burst transmission while determining the value of the transmission pattern Ss to be eight.

Likewise, according to an example shown in part (c) of FIG. 7, there are twenty packets of the layer-1-encoded data. The above-described twenty packets are transmitted through the burst transmission while determining the value of the transmission pattern Sn to be four. Then, the layer-2-encoded data and the layer-3-encoded data are abandoned due to the lack of the transmission time (not transmitted).

Thus, in the first embodiment, the transmission pattern Sn in which transmission of the packets generated based on the encoded data corresponding to the layer 1 with the highest importance (the layer-1-encoded data) is finished within the 1-frame time and the packet-loss rate is minimized (and/or no packet loss occurs) is calculated. Then, the packets generated based on the layer-1-encoded data are transmitted through the burst transmission based on the above-described transmission pattern Sn. Then, packets generated based on the encoded data corresponding to the remaining layers, that is, the layers 2 and 3 (the layer-2-encoded data and the layer-3-encoded data) are transmitted through the burst transmission within the time corresponding to the difference between the time Tr required to transmit the layer-1-encoded data and the 1-frame time. Thus, the transmission pattern is calculated for each layer and the burst transmission is performed. Consequently, it becomes possible to easily control the probability of the occurrence of a transmission error based on the layer importance. Therefore, it becomes possible to reduce the probability of the occurrence of an error in a layer with high importance even though the status of a communication path is not so well that a packet loss easily occurs. Consequently, it becomes possible to transmit video data and/or sound data with reduced disturbance to the reception apparatus. Further, if the communication path is stable, the data corresponding to a high layer with low importance is properly transmitted. Therefore, it becomes possible to perform adaptive processing.

Further, in the first embodiment, the transmission pattern Sn in which the packet-loss rate is minimized (or no packet loss occurs) is calculated. After that, it is determined whether packets generated based on the layer-1-encoded data can be transmitted based on the above-described transmission pattern Sn within the 1-frame time. If it is not possible to transmit the above-described packets, the transmission pattern Sx in which the above-described packets can be transmitted within the 1-frame time is additionally calculated, and the packets generated based on the layer-1-encoded data are transmitted through the burst transmission based on the calculated transmission pattern Sx. Therefore, it becomes possible to transmit data with high importance to the reception apparatus in an appropriate manner.

In the first embodiment, the packets generated based on the encoded data corresponding to the layers 2 and 3 (the layer-2-encoded data and the layer-3-encoded data) are collectively transmitted through the burst transmission. However, without being limited to the above-described embodiment, the packets generated based on the encoded data corresponding to the layer 2 (the layer-2-encoded data) may be transmitted through the burst transmission based on the processing corresponding to steps S503 to S505, for example. Namely, the burst transmission may be performed in any fashion so long as the transmission pattern is determined for each layer and/or plural layers and the packets are transmitted through the burst transmission based on a determined transmission pattern.

Further, the reception-state information is not limited to that described in the first embodiment. For example, the number of consecutive packet losses, the error-occurrence probability other than the packet-loss rate, etc., may be acquired, as the reception-state information.

Further, in the first embodiment, the transmission pattern Sn in which the packet-loss rate is minimized (and/or no packet loss occurs) is calculated based on the reception-state information. However, the transmission pattern Sn may be calculated without being limited to the above-described embodiment. For example, the transmission pattern Sn in which the packet-loss rate is minimized (and/or no packet loss occurs) may be calculated based on line-capacity information indicating the usable capacity of a communication line (the free capacity of the communication line), the communication line functioning as a transmission path provided between the transmission apparatus 200 and the reception apparatus. In that case, the information-acquisition device 205 can acquire the line-capacity information from an external device monitoring the communication line and/or detect the line-capacity information of its own accord, for example. Further, the information-acquisition device 205 may calculate the transmission pattern Sn in which the packet-loss rate is minimized (and/or no packet loss occurs) based on both the reception-state information and the line-capacity information.

Further, if it is determined that the value of the reception-state information (e.g., the packet-loss rate) acquired at step S501 exceeds a threshold value, and if the reception apparatus issues an instruction to perform redundant transmission for the data corresponding to a layer with the highest importance (the layer 1), the redundant transmission may be performed for the layer-1-encoded data. Further, if information about the number of the consecutive packet losses is acquired, as the reception-state information, the redundant transmission may be performed for the layer-1-encoded data when it is determined that the consecutive-packet-loss number exceeds a threshold value.

Further, in the first embodiment, it is determined whether the value of the difference time Tx corresponding to the difference between the time Tr required to transmit the layer-1-encoded data and the 1-frame time is larger than zero (refer to step S510 shown in FIG. 6). However, the threshold value set for the difference time Tx is not limited to zero. For example, a variable proportional to the amount of code of the encoded data corresponding to a layer for processing (e.g., the layer-2-encoded data) (the time (variable) conforming to the code amount of the encoded data corresponding to the layer for processing) may be determined to be the threshold value. For example, the time required to transmit the encoded data may be calculated based on the code amount of the encoded data corresponding to the layer for processing, and the required time may be determined to be the threshold value. At step S510, it is determined whether the value of the difference time Tx is larger than the threshold value (=0). In that case, however, it may be determined whether the value of the difference time Tx is equivalent to and/or larger than the threshold value. In that case, the processing corresponding to step S511 may be omitted.

Further, in the first embodiment, when the value of the difference time Tx corresponding to the difference between the sum total of the times Tr required to transmit the data corresponding to the layers for which transmission had already been finished and the 1-frame time is larger than the threshold value (equivalent to and/or larger than the threshold value), the transmission pattern Ss used to transmit the packets corresponding to layers for which data transmission is not yet performed is calculated (refer to steps S510 and S511). However, the transmission pattern Ss may be calculated without being limited to the above-described embodiment. For example, in addition to the conditions described at step S510, information about a situation where the sum total of the times Tr required to transmit the data corresponding to the layers for which the transmission had already been finished is smaller than the 1-frame time (and/or equivalent to and/or smaller than the 1-frame time) may be the condition for calculating the transmission pattern Ss used for transmit the packets corresponding to the layers for which the transmission is not yet performed. A third determination unit may be achieved by performing the above-described processing, for example. In that case, the processing corresponding to step S511 is performed when the above-described two conditions are satisfied. On the other hand, if at least one of the above-described two conditions is not satisfied, the encoded data corresponding to the layers for which the data transmission is not yet performed may be abandoned (not be transmitted). For example, the encoded data corresponding to the layers for which the data transmission is not yet performed may be abandoned (not be transmitted) when the sum total of the times Tr required to transmit the data corresponding to the layers for which the data transmission had already been finished is equivalent to and/or larger than the 1-frame time (or larger than the 1-frame time).

Second Embodiment

Next, a second embodiment of the present invention will be described. In the description of the second embodiment, the same components as those of the first embodiment will be designated by the same reference numerals as those shown in FIGS. 1 to 7, so that detailed descriptions of the same components will be omitted.

Figure 8:
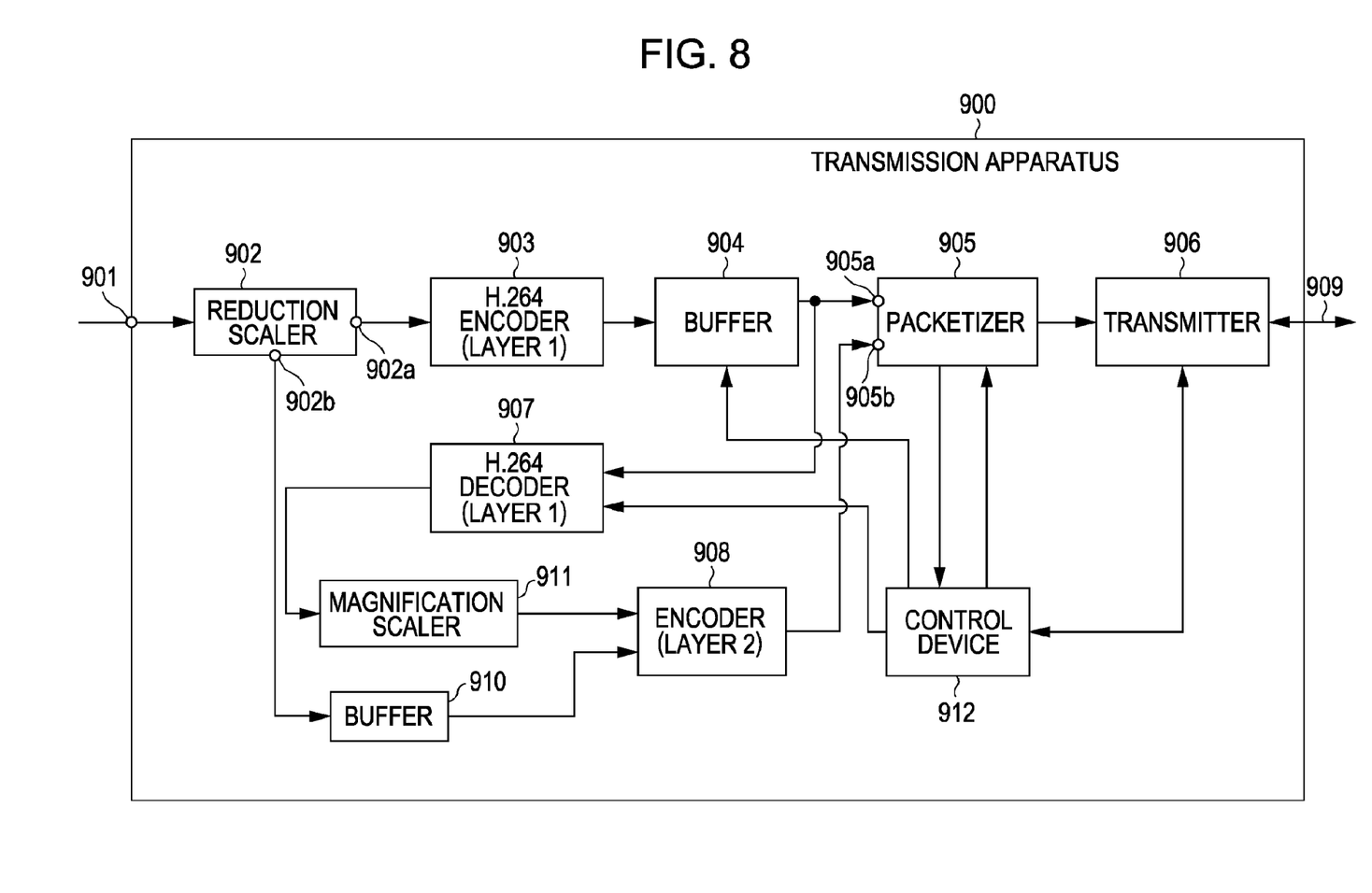
FIG. 8 shows an example of the configuration of a transmission apparatus according to a second embodiment of the present invention.
Figure 9:
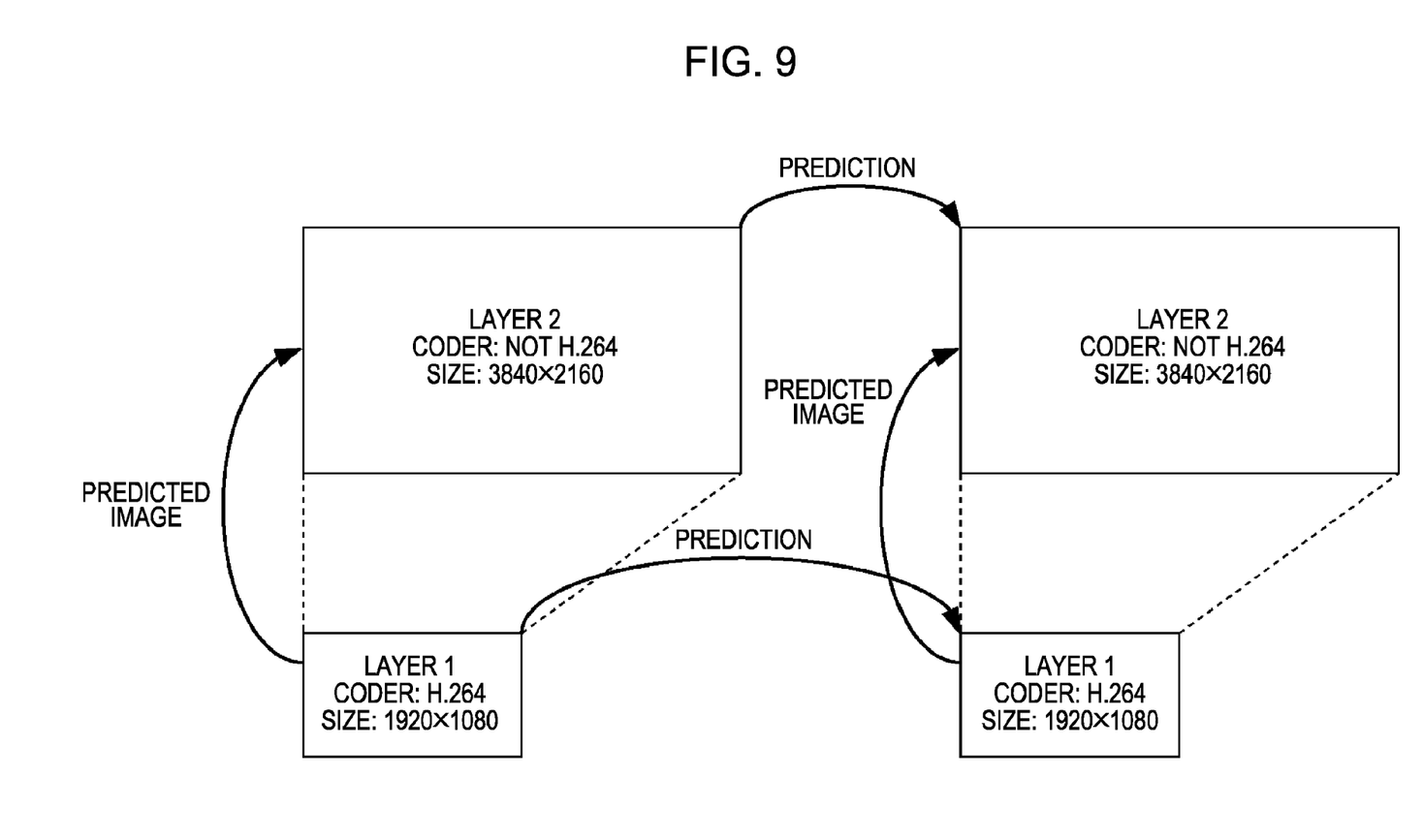
FIG. 9 conceptually shows an example image generated by the transmission apparatus according to the second embodiment.

FIG. 8 shows an example of the configuration of a transmission apparatus 900. In the second embodiment, the digital-video signals corresponding to 3840×2160 [pixels] (images of the layer 2 shown in FIG. 9) are transmitted to a reduction scaler 902 via an input end 901, for example.

The reduction scaler 902 generates the digital-video signals corresponding to 1920×1080 [pixels] (images of the layer 1 shown in FIG. 9) by vertically and horizontally reducing the image corresponding to the transmitted digital-video signals to one half the original image. The reduction scaler 902 transmits the generated digital-video signals from an end 902a to an H.264 encoder (the layer 1) 903.

On the other hand, the reduction scaler 902 externally transmits the digital-video signals (the digital-video signals corresponding to 3840×2160 [pixels]) for which the size-change processing is not performed from an end 902b and stores the digital-video signals in a buffer 910.

The H.264 encoder (the layer 1) 903 performs encoding processing (intra-frame-prediction encoding and/or the inter-frame-prediction encoding) conforming to an H.264-encoding format for the above-described digital-video signals corresponding to 1920×1080 [pixels]. The H.264 encoder (the layer 1) 903 transmits data on a network abstraction layer (NAL) to a buffer 904, as data on a result of the encoding processing. The payload of the NAL includes at least one of the digital-video signals subjected to the above-described encoding processing (a slice) and data on a parameter set or the like other than the video signals subjected to the above-described encoding processing. Here, the payload of the NAL is referred to as a raw-byte-sequence payload (RBSP).

The NAL data externally transmitted from the H.264 encoder (the layer 1) 903 is stored in the buffer 904, read at arbitrary time, and transmitted to an input end 905a of a packetizer 905.

The packetizer 905 performs the following processing based on an arbitrary packet format, as shown in FIG. 5. Namely, the packetizer 905 divides transmitted data into data items for every N [bytes] and stores each of the data items in a packet payload separately, or stores the data corresponding to N [bytes], which is a group of plural transmitted data items, in the payload of a single packet, for example. Then, the packetizer 905 generates a packet by giving a predetermined packet header including packet headers 501, 502, 503, 504, and 505 to each packet (a single payload) and externally transmits the generated packet.

Each of the packets transmitted from the packetizer 905 is transmitted to a transmitter 906. The transmitter 906 processes the transmitted packet based on a predetermined communication protocol, and transmits the transmitted packets to a reception apparatus via a communication path (a communication line) 909 through the burst transmission.

Next, example operations performed by the transmission apparatus 900 when data is transmitted to the packetizer 905 via both the input end 905a and an input end 905b, namely, when the encoded data corresponding to each of the layers 1 and 2 exists, will be described.

The encoded data which is encoded by the H.264 encoder (the layer 1) 903 and stored in the buffer 904 is read under the control of a control device 912 and transmitted to an H264.1 decoder (the layer 1) 907.

The H264.1 decoder (the layer 1) 907 decodes the transmitted encoded data (the data encoded by the H.264 encoder (the layer 1) 903) and transmits the decoded data to a magnification scaler 911 under the control of the control device 912. In the following description, the encoded data subjected to the decoding is referred to as locally-decoded-digital-video signals, as required.

The locally-decoded-digital-video signals are transmitted to the magnification scaler 911, and the magnification scaler 911 vertically and horizontally magnifies the image corresponding to the transmitted locally-decoded-digital-video signals by two times. That is to say, the magnification scaler 911 performs the reverse of the reduction processing performed by the reduction scaler 902. Consequently, the digital-video signals of the same size as that of the digital-video signals transmitted to the input end 901 are transmitted to an encoder (the layer 2) 908.

At the same time, the encoder (the layer 2) 908 reads the digital-video signal corresponding to the locally-decoded-digital-video signal transmitted to the H264.1 decoder 907 (of the same frame as that of the locally-decoded-digital-video signal) from the buffer 910.

The encoder (the layer 2) 908 calculates the value of the difference between the two transmitted digital-video signals (an inter-layer-prediction error) for each frame. The encoder (the layer 2) 908 encodes the inter-layer-prediction error calculated for each frame based on an encoding format unique to the encoder (the layer 2) 908 (the intra-frame encoding and/or the inter-frame-prediction encoding). Here, the encoding format unique to the encoder (the layer 2) 908 denotes an independent encoding format which is not compatible with H.264.

The encoded data transmitted from the encoder (the layer 2) 908 is transmitted from the input end 905b to the packetizer 905. As is the case with the encoded data transmitted from the input end 905a, the packetizer 905 generates a packet based on the encoded data transmitted from the input end 905b based on an arbitrary packet format. That is to say, the packetizer 905 divides data transmitted thereto into data items for every N [bytes] and stores each of the data items in a packet payload separately, or stores the data corresponding to N [bytes], which is a group of plural transmitted data items, in the payload of a single packet, for example. Then, the packetizer 905 generates a packet by giving a predetermined packet header including the packet headers 501, 502, 503, 504, to each packet and externally transmits the generated packet.

Each of the packets transmitted from the packetizer 905 is transmitted to the transmitter 906. The transmitter 906 processes the transmitted packet based on a predetermined communication protocol, and transmits the transmitted packets to the reception apparatus via the communication path (the communication line) 909 through the burst transmission.

Figure 10:
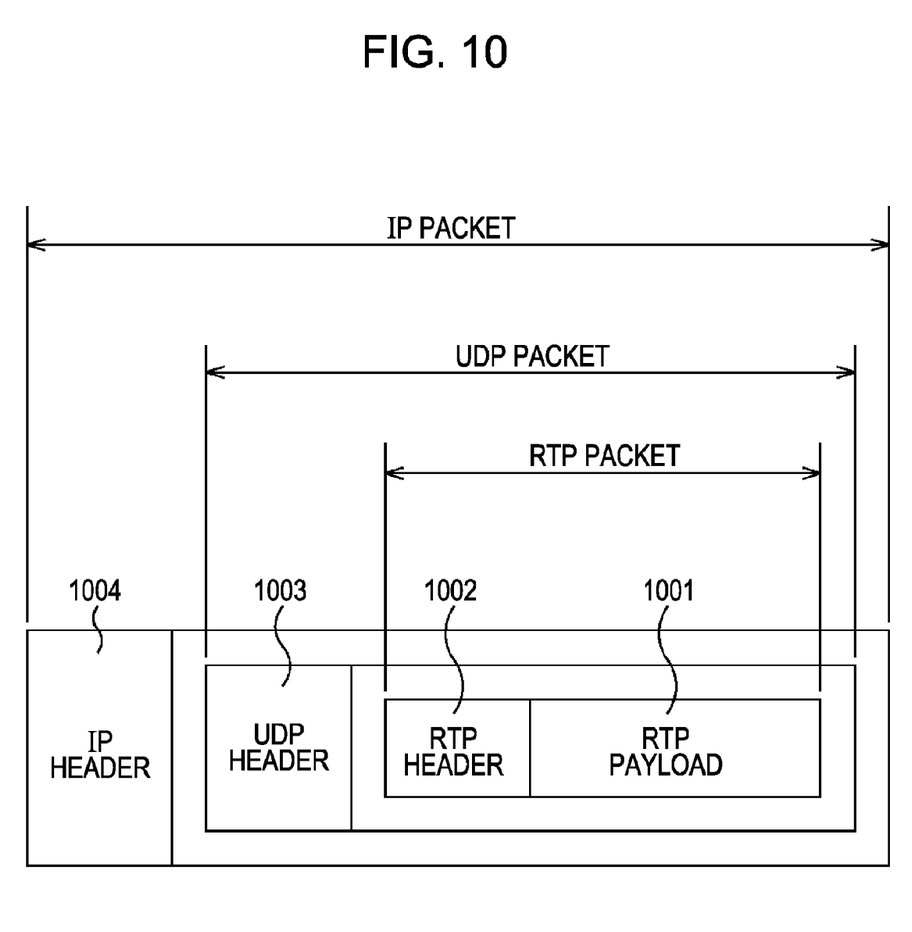
FIG. 10 shows an example packet transmitted from a transmitter according to the second embodiment.

FIG. 10 shows an example of a packet transmitted from the transmitter 906.

For example, when the communication protocol is the real-time transport protocol (RTP) (user datagram protocol (UDP)), the transmitter 906 stores a packet transmitted from the packetizer 905 in the payload (RTP payload) 1001 of an RTP packet. Then, the transmitter 906 generates an RTP packet including the RTP payload 1001 and the header of the RTP packet (RTP header) 1002.

Since the RTP does not have identification information about an end point, the RTP is insufficient to function as a transport protocol. Therefore, in the second embodiment, the transmitter 906 uses the UDP as a lower layer, as shown in FIG. 10. That is to say, the transmitter 906 generates a UDP packet to which a header-of-the-UDP packet (UDP header) 1003 is added and transmits the UDP packet to the data part of a UDP packet storing the RTP packet. Further, it becomes possible to generate an internet-protocol (IP) packet to which a header-of-the-IP packet (IP header) 1004 is added and transmit the IP packet to the data part of an IP packet storing the UDP packet, as shown in FIG. 10.

The transmitter 906 has a function of detecting the free capacity of the communication path (communication line) 909. Further, the transmitter 906 has a function of calculating a transmission pattern in which the error-occurrence probability such as the packet-loss rate is minimized based on the detected free capacity of the communication path 909, the code amount of a transmitted packet, and the maximum value of a transmission time specified for the code amount of the transmitted packet. Then, the transmitter 906 has a function of transmitting a packet through the burst transmission in the calculated transmission pattern. Incidentally, the control device 912 may have part of or all of the above-described functions.

Further, upon receiving plural encoded data items included in the same frame, where the degrees of importance given to the encoded data items are different from one another (the layer-1-encoded data and the layer-2-encoded data), the transmitter 906 performs the following processing. Namely, the transmitter 906 performs the same processing as that performed in the above-described first embodiment for encoded data with the highest importance (the layer-1-encoded data). For transmitting all of the packets generated based on the layer-1-encoded data of a frame for processing (the whole code amount) in the current communication environment, the transmitter 906 calculates a transmission pattern in which the packet-loss rate is minimized and the time Tr required to perform the data transmission is minimized within the 1-frame time. Then, the transmitter 906 performs the burst transmission for the packet generated based on the layer-1-encoded data in the calculated transmission pattern.

Next, the transmitter 906 calculates the difference time Tx corresponding to the difference between the time Tr required to transmit the layer-1-encoded data and the 1-frame time, and determines whether the value of the calculated difference time Tx is larger than zero. If the determination result shows that the value of the difference time Tx is larger than zero, the transmitter 906 calculates a transmission pattern used to transmit all of the packets generated based on the layer-2-encoded data. Then, the transmitter 906 determines whether there is a transmission pattern which allows for transmitting all of the packets generated based on the layer-2-encoded data within the difference time Tx. If the determination result shows that there is the transmission pattern which allows for transmitting all of the packets generated based on the layer-2-encoded data, the burst transmission is performed for all of the packets generated based on the layer-2-encoded data in the above-described transmission pattern (refer to part (b) of FIG. 7).

On the other hand, if the value of the difference time Tx is not larger than zero, or if there is no transmission pattern which allows for transmitting all of the packets generated based on the layer-2-encoded data within the difference time Tx, the packets generated based on the layer-2-encoded data are not transmitted (abandoned). Incidentally, if at least three types of packets are transmitted, where the degrees of importance given to the packets are different from one another, the same processing as the above-described processing can be performed. Further, as is the case with the first embodiment, the control device 912 may have, for example, the function of calculating the transmission patterns.

The above-described calculation of the transmission pattern used for the layer-1-encoded data with the highest importance can be performed for each frame. However, it is preferable that the transmission pattern is calculated for each intra-encoded frame in which the largest amount of code occurs without being limited to the above-described description. When transmitting encoded data, where the amount of code occurred in the encoded data is known (e.g., entirely encoded video contents), it is preferable that a transmission pattern is calculated for a frame, where the code amount of the frame exceeds an arbitrarily determined threshold value.

If the control device 912 detects that data is transmitted to the packetizer 905 only from the H.264 encoder (the layer 1) 903, the transmitter 906 performs the following processing under the control of the control device 912. Namely, the transmitter 906 calculates a transmission pattern in which an amount of code, the amount corresponding to a single frame (a packet), is distributed over the 1-frame time. Then, the transmitter 906 performs the data transmission by using the calculated transmission pattern (refer to part (c) of FIG. 7, for example). The above-described processing may be performed when the H.264 encoder (the layer 1) 903 is set to activation mode and the encoder (the layer 2) 908 is set to non-activation mode (when data is transmitted only to the H.264 encoder) under the control of the control device 912.

In each of the above-described embodiments, the transmission pattern is not limited to only one kind. For example, a pattern which allows for adjusting transmission intervals at which a single packet is transmitted so that the transmission intervals become uniform in the 1-frame time may be determined to be the transmission pattern in view of the circumstances of the transmission apparatuses 200 and 900.

Other Embodiments

Each of units and/or steps included in the image-processing apparatuses and/or the image-processing methods according to the above-described embodiments of the present invention can be achieved by an operating program stored in a random-access memory (RAM) and/or a read-only memory (ROM) of a computer. The program and/or a computer-readable recording medium storing the program constitutes another embodiment of the present invention.

Further, each of a system, an apparatus, a method, a program, a storage medium, etc. may constitute another embodiment of the present invention. More specifically, the present invention can be used for a system including plural units, or an apparatus including a single unit only.

Further, program code of software implementing the functions of the above-described embodiments (program code corresponding to the flowchart of FIG. 6 in the above-described embodiments) is supplied to the system and/or the apparatus directly and/or remotely. Then, a computer of the system and/or the apparatus reads and executes the supplied program code so that the functions of the above-described embodiments can be achieved, which constitutes another embodiment of the present invention.

Therefore, the program code itself installed in the computer, so as to achieve functional processing of the present invention by the computer, also constitutes another embodiment of the present invention. Namely, a computer program itself provided to achieve the functional processing can constitute another embodiment of the present invention.

In that case, the above-described computer program may be object code, a program executed by an interpreter, script data supplied to an operating system (OS), etc., so long as the computer program has program functions.

A recording medium provided to supply the program may be, for example, a floppy (registered trademark) disk, a hard disk, an optical disk, a magneto-optical disk, a magneto-optical disk (MO), a compact disk (CD)-read only memory (ROM), a CD-recordable (R), a CD-rewritable (RW), etc. The above-described recording medium may further be a magnetic tape, a nonvolatile memory card, a ROM, a digital-versatile disk (DVD) including a DVD-ROM and a DVD-R, etc.

Further, the program may be supplied in the following methods. For example, a user accesses a home page established on the Internet by using a browser of a client computer. Then, the user downloads the computer program itself of the present invention from the home page and/or compressed file data including data on an automatic-install function to a recording medium such as a hard disk.

Further, the program can be supplied by dividing program code generating the program of the present invention into plural file-data items and downloading the file-data items from different home pages. Namely, a WWW server provided to download program-file-data items used to achieve the functional processing of the present invention by using a computer to plural users also constitutes another embodiment of the present invention.

Further, the program of the present invention may be encoded and stored in storage mediums such as CD-ROMs distributed to users. Then, key information used to decode the encoded program may be downloaded from the home page to a user satisfying predetermined conditions via the Internet. Through the use of the downloaded key information, the encoded program can be executed and installed in a computer so that the program is supplied to the system and/or the apparatus.

Further, not only by the computer reading and executing the read program, but also by the computer executing part of or the entire process utilizing an OS, etc. running on the computer based on instructions of the program, the functions of the above-described embodiments may be achieved.

Further, the program read from the recording medium may be written into a memory of a function-expansion board inserted into the computer and/or a function-expansion unit connected to the computer. Then, a central processing unit (CPU), etc. of the function-expansion board and/or the function-expansion unit may execute part of or the entire process based on instructions of the program so that the functions of the above-described embodiments are achieved.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-211389 filed on Aug. 14, 2007, which is hereby incorporated by reference herein in its entirety.

What is claimed is:

1. A transmission apparatus comprising:
   at least one processor programmed to control:
      an encoder unit configured to encode data, the encoder unit including a plurality layers;
      a packetizing unit configured to generate a packet based on the data encoded by the encoder unit;
      an information acquisition unit configured to acquire reception-state information indicating a reception state of a reception apparatus functioning as a transmission destination of the packet;
      a determination unit configured to determine transmission intervals at which the generated packet is transmitted for each of the layers; and
      a transmission unit configured to transmit the generated packet at the determined transmission intervals,
   wherein the determination unit calculates transmission intervals so that a probability of occurrence of the packet loss is reduced for at least one of the plurality of layers based on the reception-state information.

2. The transmission apparatus according to claim 1, wherein the determination unit calculates transmission intervals based on the reception-state information and line-capacity information indicating a capacity of a communication line functioning as a transmission path of the packet.

3. The transmission apparatus according to claim 1, wherein the determination unit determines intervals at which the packet generated based on encoded data corresponding to at least one of the plurality of layers is transmitted so that transmission of the packet generated based on the encoded data corresponding to the at least one of the plurality of layers is finished within a predetermined time.

4. The transmission apparatus according to claim 1, further comprising a decision unit configured to decide importance given to each of the plurality of layers, wherein the transmission unit transmits the packet generated based on encoded data corresponding to a layer decided to be the most important layer by the decision unit with top priority.

5. The transmission apparatus according to claim 4, further comprising:
   a second determination unit configured to determine whether a value of a time corresponding to a difference between a sum total of times required to transmit at least one packet generated based on encoded data corresponding to a layer on which data had already been transmitted by the transmission unit and a predetermined time is equivalent to or larger than a threshold value, or larger than the threshold value; and
   an abandonment unit configured to abandon encoded data corresponding to at least one layer on which data is not yet transmitted when the second determination unit determines that the difference-time value is smaller than the threshold value, or the difference-time value is equivalent to or smaller than the threshold value, wherein when the second determination unit determines
that the difference-time value is equivalent to or larger
than the threshold value, or the difference-time value is
larger than the threshold value, the determination unit
determines intervals at which at least one packet generated based on encoded data corresponding to a layer
which is the most important of the at least one layer on
which data is not yet transmitted is transmitted so that
transmission of the packet generated based on the
encoded data corresponding to the most important layer
is finished within the difference time.

6. The transmission apparatus according to claim 5, further comprising:
a third determination unit configured to determine whether
the sum total of the times required to transmit the at least
one packet generated based on the encoded data corresponding to the layer on which data had already been
transmitted by the transmission unit is equivalent to or
smaller than the predetermined time, or smaller than the
predetermined time; and
an abandonment unit configured to abandon the encoded
data corresponding to the at least one layer on which data
is not yet transmitted when the third determination unit
determines that the sum total of the required times is
larger than the predetermined time, or the sum total of
the required times is equivalent to or larger than the
predetermined time,
wherein when the third determination unit determines that
the sum total of the required times is equivalent to or
smaller than the predetermined time, or the sum total of
the required times is smaller than the predetermined
time, the determination unit determines the intervals at
which the packet generated based on the encoded data
corresponding to the layer which is the most important
of the at least one layer on which data is not yet transmitted is transmitted so that the transmission of the
packet generated based on the encoded data corresponding to the most important layer is finished within the
difference time.

7. The transmission apparatus according to claim 5,
wherein the encoder unit encodes data corresponding to a
single frame including the plurality of layers,
wherein the predetermined time is a single-frame time, and
wherein the threshold value is a variable proportional to an
amount of code of the encoded data corresponding to the
layer on which data is not yet transmitted.

8. The transmission apparatus according to claim 1,
wherein when a reception apparatus designates redundant
transmission for at least one packet generated based on
encoded data corresponding to a layer which is the most
important of all of the plurality of layers, the reception apparatus being provided as a transmission destination of the
packet, and when it is determined that a number of consecutive packet losses and a packet-loss rate exceeds a threshold
value, where information about the consecutive-packet-loss
number and the packet-loss rate is acquired from the reception apparatus, the transmission unit performs the redundant
transmission for the packet generated based on the encoded
data corresponding to the most important layer.

9. A transmission method comprising:
encoding data in a plurality of layers;
generating a packet based on the encoded data;
acquiring reception-state information indicating a reception state of a reception apparatus functioning as a transmission destination of the packet;
determining transmission intervals at which the generated
packet is transmitted for each of the layers; and
transmitting the generated packet at the transmission intervals,
wherein the transmission intervals are calculated so that a
probability of occurrence of the packet loss is reduced
for at least one of the plurality of layers based on the
reception-state information.

10. A non-transitory computer storage medium having a
computer-executable program stored thereon for causing a
computer to execute a method for transmission, the method
comprising:
encoding data in a plurality of layers;
generating a packet based on the encoded data;
acquiring reception-state information indicating a reception state of a reception apparatus functioning as a transmission destination of the packet;
determining transmission intervals at which the generated
packet is transmitted for each of the layers; and
transmitting the generated packet at the transmission intervals,
wherein the transmission intervals are calculated so that a
probability of occurrence of the packet loss is reduced
for at least one of the plurality of layers based on the
reception-state information.

* * * * *